United States Patent [19]
Anma et al.

[11] Patent Number: 5,675,189
[45] Date of Patent: Oct. 7, 1997

[54] VEHICLE MULTIPLEX TRANSMISSION APPARATUS

[75] Inventors: Mitsuru Anma; Nozomi Kawasaki, both of Shizuoka-ken; Seiji Hirano, Hiroshima; Osamu Michihira, Hiroshima; Hideki Nakazono, Hiroshima; Masaaki Shimizu, Iwakuni; Kouji Umegaki, Hiroshima, all of Japan

[73] Assignees: Yazaki Corporation, Tokyo; Mazda Motor Corporation, Hiroshima

[21] Appl. No.: 288,189

[22] Filed: Aug. 9, 1994

Related U.S. Application Data

[63] Continuation of Ser. No. 936,627, Aug. 28, 1992, abandoned.

[30] Foreign Application Priority Data

| Aug. 30, 1991 | [JP] | Japan | 3-220286 |
| Aug. 30, 1991 | [JP] | Japan | 3-220287 |
| Sep. 27, 1991 | [JP] | Japan | 3-249420 |

[51] Int. Cl.$^6$ ............................................. H02J 9/00
[52] U.S. Cl. ............................................. 307/9.1; 307/10.1
[58] Field of Search ............................... 307/9.1, 10.1, 307/10.7, 23, 29, 64, 70, 80, 85, 86, 87, 125, 130, 131

[56] References Cited

U.S. PATENT DOCUMENTS

| 4,403,155 | 9/1983 | Aoki et al. | 307/10.1 |
| 4,419,588 | 12/1983 | Goiset | 307/9.1 |
| 4,551,632 | 11/1985 | Jourdan et al. | 307/9.1 |
| 4,639,609 | 1/1987 | Floyd et al. | 307/10.1 |
| 4,672,296 | 6/1987 | Griffin | 307/10.1 |
| 4,677,311 | 6/1987 | Morita | 307/66 |
| 4,788,449 | 11/1988 | Katz | 307/64 X |
| 4,956,561 | 9/1990 | Tamer | 307/10.1 |
| 5,079,759 | 1/1992 | Kajiyama | 370/13 |
| 5,090,012 | 2/1992 | Kajiyama et al. | 370/85.3 |

FOREIGN PATENT DOCUMENTS

| 0 062 601 | 10/1982 | European Pat. Off. |
| 86/07210 | 12/1986 | France |
| 28 01 122 | 7/1979 | Germany |
| 36 24 455 | 1/1988 | Germany |
| 57-80239 | 5/1982 | Japan |
| 62-39354 | 3/1987 | Japan |
| 63-222953 | 9/1988 | Japan |

OTHER PUBLICATIONS

Patent Abstracts of Japan; Group M783; vol. 13, No. 13; Jan. 12, 1989; 63–222953; Hashimoto et al.; Appl. No: 62–56862.

*Primary Examiner*—Fritz M. Fleming

[57] ABSTRACT

A vehicle multiplex transmission apparatus which can operate all the auxiliary units of a vehicle even when a power supply line of the vehicle is locally short-circuited. This vehicle multiplex transmission apparatus includes a plurality of control nodes arranged in respective portions of a vehicle, for controlling vehicle auxiliary units, and a multiplex transmission line for connecting among the plurality of control nodes. The control nodes are connected to a power supply node arranged at a predetermined position of a vehicle body through two independent systems of first and second power supply lines. The first power supply line supplies power to vehicle travel auxiliary units. The second power supply line supplies power to general system auxiliary units, but it can supply power to the travel auxiliary units as needed.

25 Claims, 10 Drawing Sheets

VEHICLE MULTIPLEX TRANSMISSION APPARATUS

This application is a continuation of application Ser. No. 07/936,627, filed Aug. 28, 1992, now abandoned.

BACKGROUND OF THE INVENTION

The present invention relates to a vehicle multiplex transmission apparatus and, more particularly, to a vehicle multiplex transmission apparatus comprising dual power supply lines.

DESCRIPTION OF THE RELATED ART

In recent years, as auxiliary units in a vehicle, electrical actuators are popularly used in place of mechanical actuators. Since a variety of auxiliary units are arranged, an electrical wiring structure is complicated due to mixing of wiring lines for supplying electrical power from one DC power supply to various auxiliary units, and signal transmission wiring lines among various auxiliary units.

In order to solve this problem, in one proposal, control nodes for controlling various auxiliary units are connected through multiplex transmission signal lines, thereby reducing the number of signal lines. As a method of supplying electrical power to each node in this case, for example, as disclosed in Japanese Utility Model Laid-Open No. 62-39354, a plurality of power supply lines connected to a power supply are independently connected to nodes, and a power supply voltage is supplied to the nodes through the independent power supply lines.

However, when the above-mentioned wiring structure of the power supply lines is employed, the power supply lines to the control nodes are independent from each other. For this reason, when a specific auxiliary unit is short-circuited, and a power supply line for supplying electrical power to the control node for controlling the short-circuited auxiliary unit is disconnected, since no path for supplying the power supply voltage to this control node is present, the electrical power cannot be supplied to a control unit and a communication unit of this control node. When the supply of the electrical power to the control unit and the communication unit is stopped, even if devices such as sensors, switches, and the like connected to the control unit are operable, since this control node cannot transmit signals to other control nodes, these devices such as sensors, switches, and the like become practically disabled.

In another proposal, the multiplex transmission system is adopted not only to decrease the number of signal lines but also to decrease the number of power supply lines. More specifically, various auxiliary units are connected in turn through a circuit of power supply lines. With this system, since all the auxiliary units of a vehicle can be connected through a circuit of power supply lines, the number of power supply lines can be remarkably decreased. However, when the auxiliary units are connected in this manner, if one power supply line is short-circuited, all the auxiliary units of the vehicle are disabled at a time. For this reason, when this system is employed, some redundant system is required to avoid the above-mentioned trouble.

From this viewpoint, as disclosed in Japanese Patent Laid-Open No. 57-80239, signal lines and electrical power lines comprising a plurality of electrical power controllers are harnessed in a loop pattern, and terminal controllers are connected to signal lines and electrical power lines branching from portions between adjacent electrical power controllers. Terminals are connected to these terminal controllers. When an abnormal current flows through the power supply line due to short-circuiting, the plurality of electrical power controllers are operated in turn in a state wherein power supply to the terminals is stopped. When the abnormal current is detected again, a section between the corresponding power supply controllers is disconnected.

However, in this prior art, the electrical power controllers disturb a lightweight, compact, and low-cost structure since they require considerable space and cost. When short-circuiting occurs, as described above, after power supply to the circuit is stopped, the electrical power controllers are operated in turn to detect a short-circuited portion, and a section between the corresponding electrical power controllers is disconnected, thus requiring a long period of time until the short-circuited portion is detected. During the period until the short-circuited portion is detected, electrical power cannot be supplied to the auxiliary units, and this results in danger if a vehicle is traveling.

In particular, when the disconnected controllers are those for controlling travel system auxiliary units (i.e., auxiliary units associated with vehicle traveling functions, i.e., traveling, turning, and stopping), the travel system auxiliary units are disabled until the short-circuited portion is detected, and a vehicle cannot normally travel.

SUMMARY OF THE INVENTION

The present invention has been made in consideration of the above situation, and has as its principal object to provide a vehicle multiplex transmission apparatus, which can operate all the auxiliary units of a vehicle even when power supply lines of the vehicle are locally short-circuited.

It is another object of the present invention to provide a vehicle multiplex transmission apparatus, which allows exchange of signals among nodes even when a power supply line for an auxiliary unit is disconnected.

It is still another object of the present invention to provide a vehicle multiplex transmission apparatus, which can continue supply of electrical power to travel system auxiliary units even when an abnormality occurs in a power supply line for supplying electrical power to the travel system auxiliary units.

In order to solve the above-mentioned problems, and to achieve the above objects, a vehicle multiplex transmission apparatus according to the present invention is characterized by the following arrangement.

More specifically, in a vehicle multiplex transmission apparatus, which comprises a plurality of control nodes, arranged in respective portions of a vehicle, for controlling vehicle auxiliary units, and a multiplex transmission line for connecting among the plurality of control nodes, the control nodes are connected to a power supply node arranged at a predetermined position of a vehicle body through two independent systems of first and second power supply lines.

Other features and advantages besides those discussed above, shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

DETAILED DESCRIPTION OF THE PREFERRED EMBODIMENTS

The preferred embodiments of the present invention will be described in detail hereinafter with reference to the accompanying drawings.

Prior to the detailed description of the embodiments, the outline of multiplex transmission in a conventional vehicle will be explained below.

Figure 1:
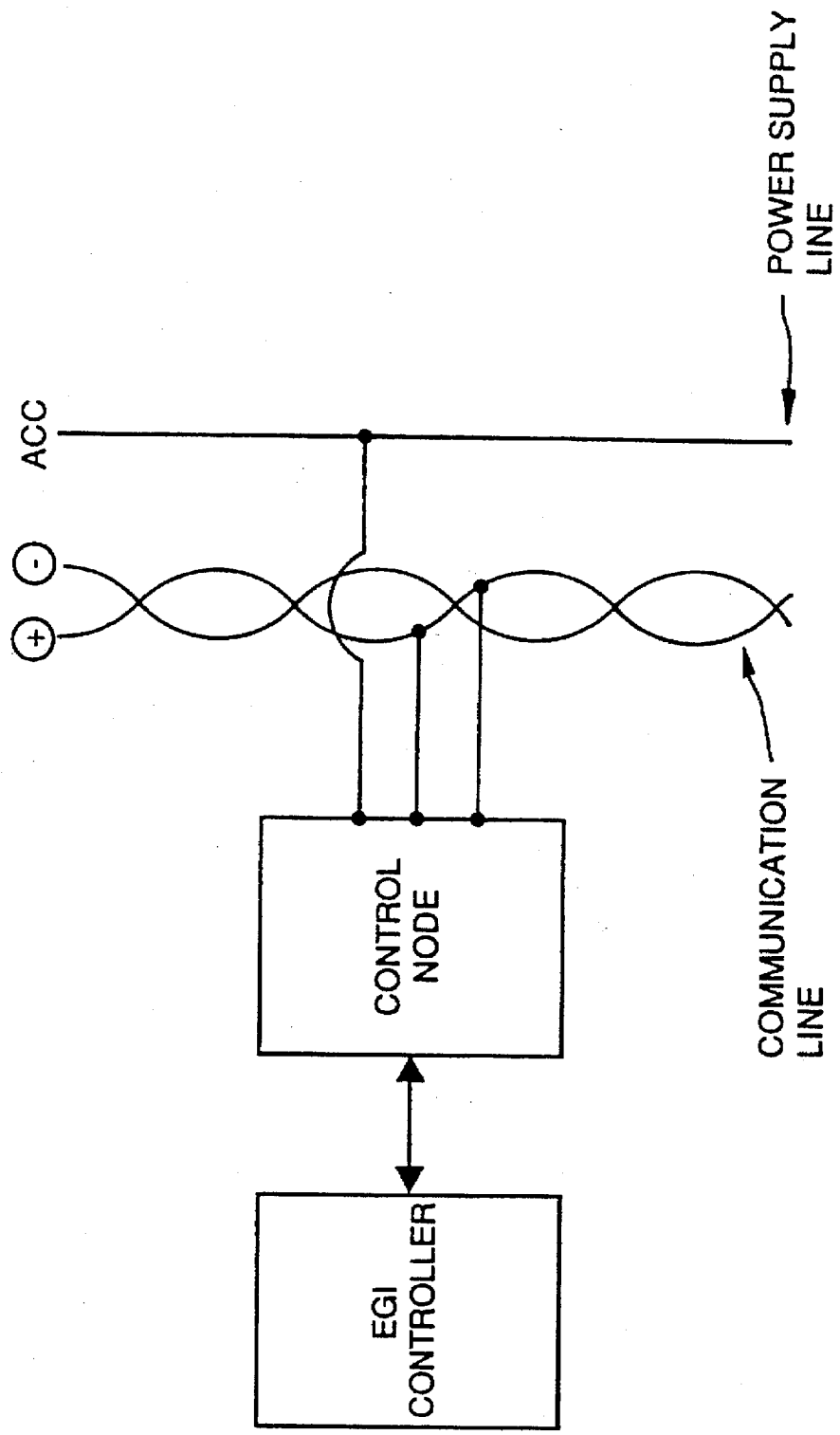
FIG. 1 is a diagram showing a connection state of a communication line and a power supply line at one node of a conventional vehicle multiplex transmission apparatus.

In multiplex transmission for a vehicle, as shown in FIG. 1, control nodes arranged in respective portions of the vehicle are connected through a communication line consisting of twisted wires, and communications among the control nodes are performed through the communication line. The control node is connected to an auxiliary unit such as an EGI controller. As shown in FIG. 1, the control nodes are connected to a power supply line, and electrical power is supplied to the control nodes and auxiliary units through the power supply line.

Figure 2:
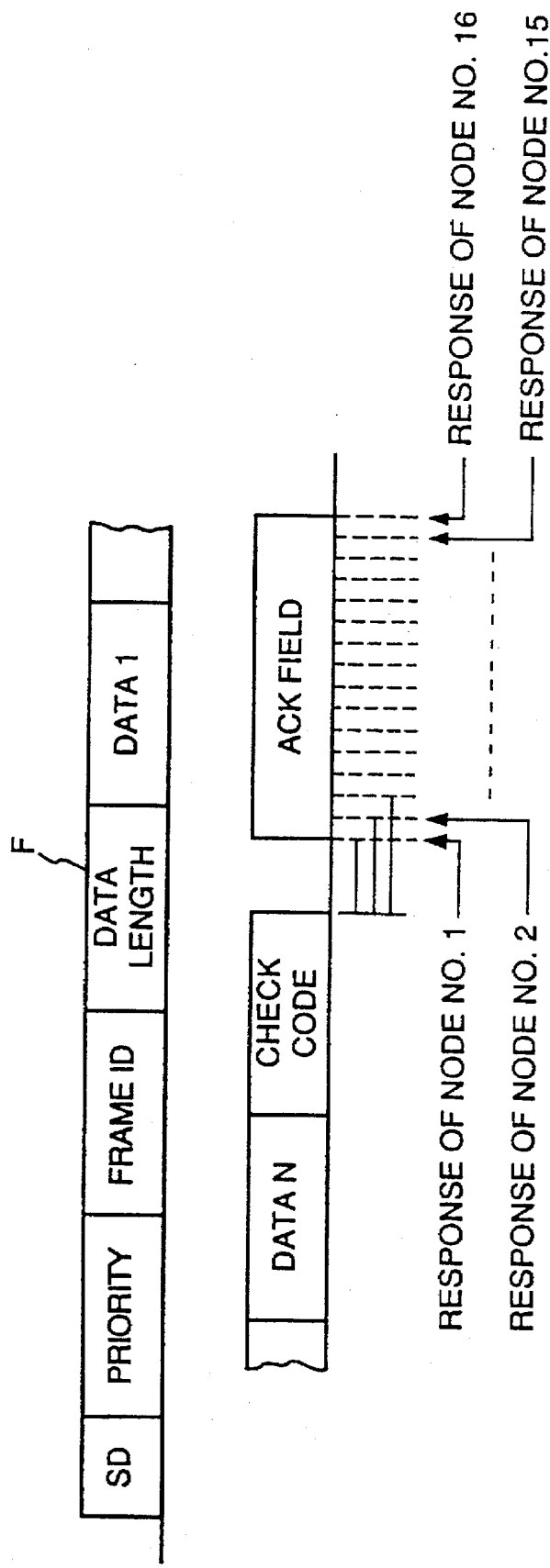
FIG. 2 shows a format of a frame used in conventional multiplex transmission.

In a vehicle multiplex transmission apparatus with the above arrangement, vehicle driving information is transmitted in units of frames F each having the format, as shown in FIG. 2.

The frame F consists of an SD (Start Delimiter), a priority code, a frame ID code, a data length, data 1 to data N, and a check code. The "SD code" is a specific code representing the start of the frame F. Upon reception of the SD code, a receiving multiplex node detects the start of the frame F. The "priority code" indicates the priority order of signals to be processed when a plurality of multiplex nodes simultaneously transmit data, and the signals collide with each other. In this case, higher priority is assigned as the priority code has a lower bit value. This is because low level is defined by WIRED-OR on a bus. If a plurality of nodes simultaneously transmit signals, since the "priority code" of the node having the highest priority remains on the bus, the nodes having lower priority can detect signal collision since the "priority code" sent therefrom are changed to another code. Such a node delays re-transmission of its own failure frame, so that re-transmission from a node having higher priority is preferentially performed.

The "frame ID code" is a code indicating the destination of the frame, and corresponds to functional addressing in reference "A Proposal for a Vehicle Network Protocol Standard" published in SAE International Congress and Exposition (February, 1986). This ID code is assigned by a transmission source node.

In the "data length", the number of following data is stored, and if there are N data, N is sent as the data length. A multiplex node that received this frame reads the data by the content of the data length. A field following the data is a CRC check code (error detection code), and a node checks this code to detect the end of the frame. Note that the format shown in FIG. 2 is a general format, and for example, the data length of the frame is fixed to 4 bytes. A single frame includes, e.g., EGI information and ABS information.

The outline of multiplex transmission for the vehicle has been described.

The embodiments of the present invention will be described below.

(First Embodiment)

Figure 3:
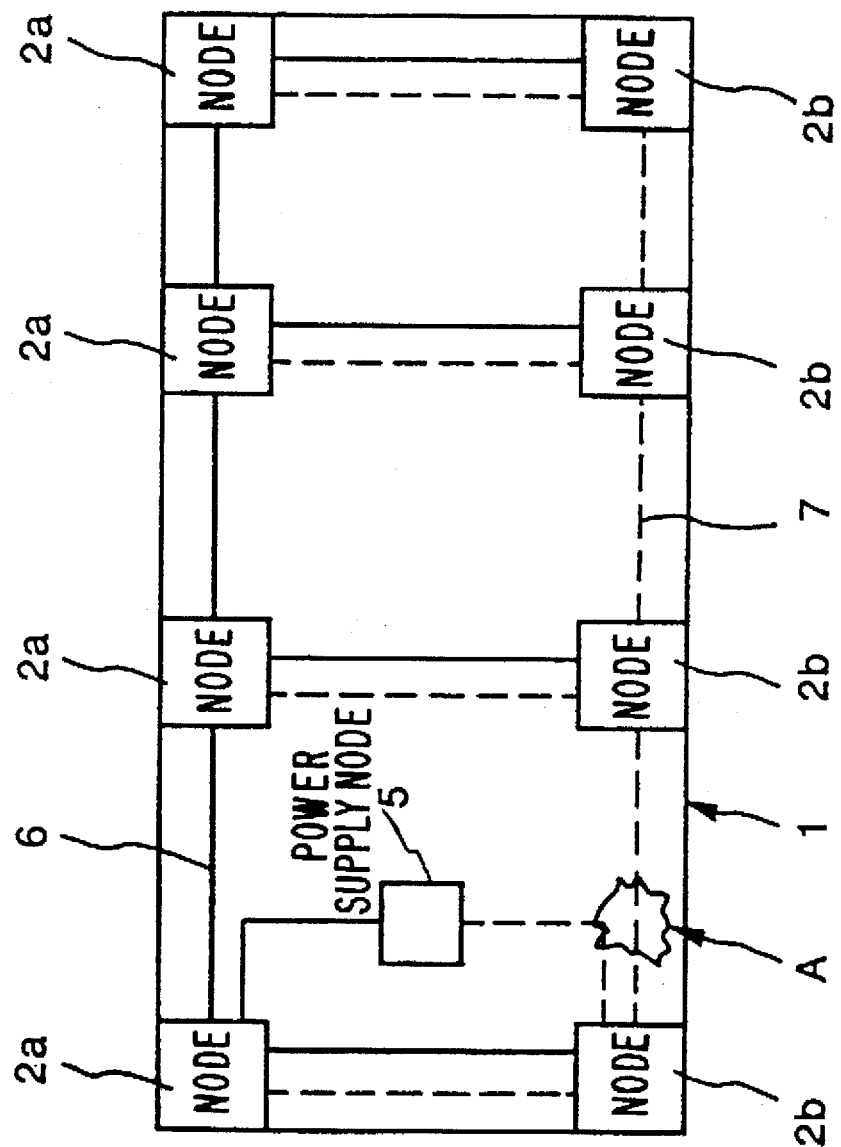
FIG. 3 is a block diagram showing the overall arrangement of a vehicle multiplex transmission apparatus according to the first embodiment of the present invention.
Figure 4:
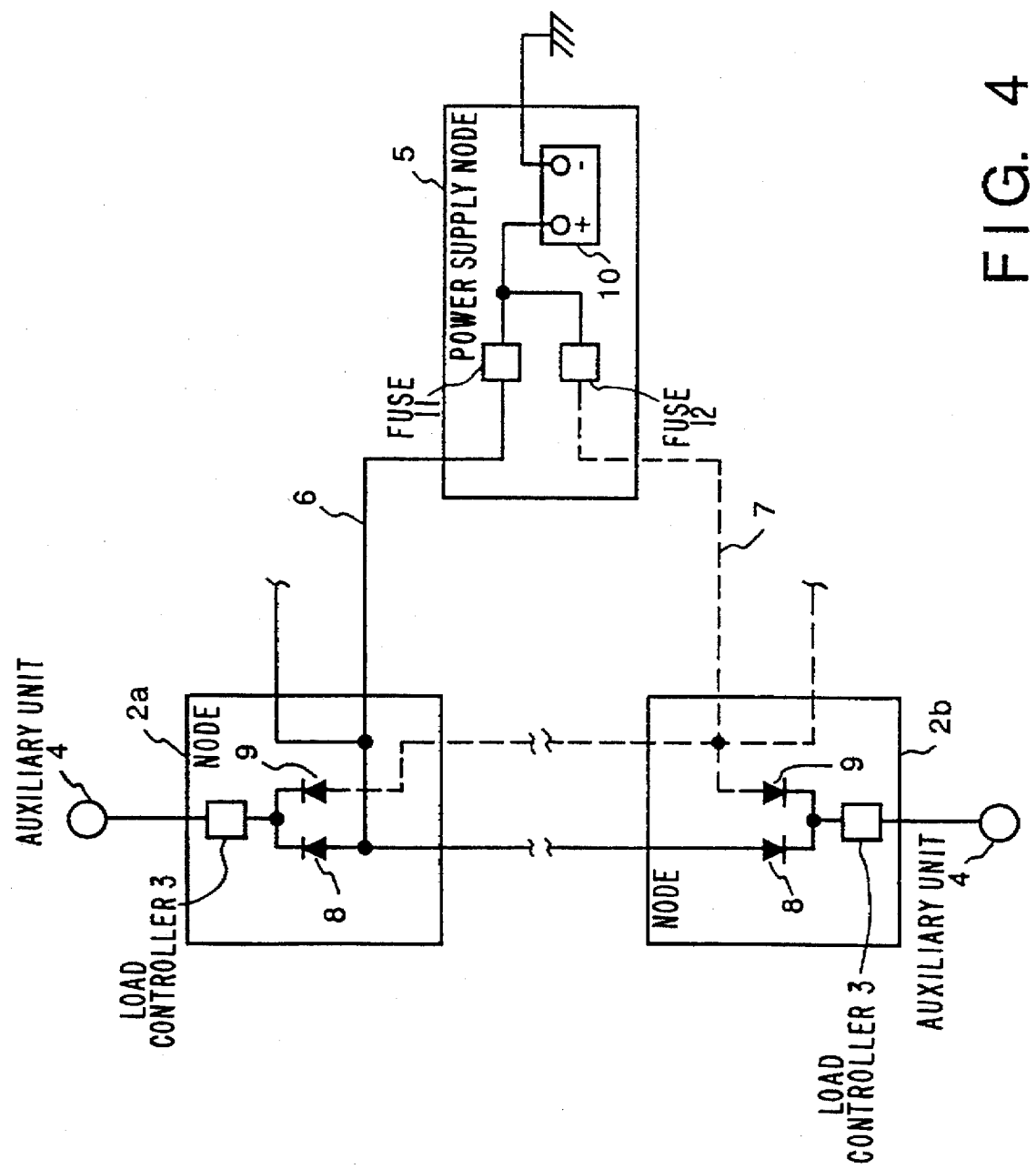
FIG. 4 is a diagram showing the details of a node and a power supply node in the vehicle multiplex transmission apparatus according to the first embodiment of the present invention.

FIGS. 3 and 4 show a vehicle multiplex transmission apparatus according to the first embodiment.

A plurality of right and left nodes 2a and 2b each comprising a load controller 3 for controlling a vehicle auxiliary unit (load) 4 are arranged at the right and left sides of a vehicle body 1 of a vehicle.

The right nodes 2a arranged at the right side of the vehicle body 1 are connected to a power supply node 5 arranged at a proper position (e.g., at a front portion) of the vehicle body 1 through a first power supply line 6 in the back-and-forth direction of the vehicle body. The left nodes 2b arranged at the left side of the vehicle body 1 are connected to the power supply node 5 through a second power supply line 7 in the back-and-forth direction of the vehicle body.

The right and left nodes 2a and 2b are connected to each other through the first and second power supply lines 6 and 7. In other words, the right and left nodes 2a and 2b are connected through two independent systems of the power supply lines 6 and 7.

Thus, the right nodes 2a form a group of control nodes which are connected in series by the power supply line 6, and the left nodes 2b form a group of control nodes which are connected in series by the power supply line 7.

Note that the nodes 2a and 2b are connected to each other through a multiplex transmission communication line (not shown) comprising twisted wires, as described above.

The load controller 3 in each of the nodes 2a and 2b is connected to the first and second power supply lines 6 and 7 through reverse-flow prevention diodes 8 and 9.

The power supply node 5 comprises a battery 10, and protection means (e.g., fuses) 11 and 12 for respectively protecting the first and second power supply lines 6 and 7 connected to the "+" terminal of the battery 10. The "−" terminal of the battery 10 is grounded.

The vehicle multiplex transmission apparatus with the above-mentioned arrangement operates as follows.

For example, when a portion A of the second power supply line 7 is short-circuited by a collision on the left side of the vehicle, the protection means 12 that protects the second power supply line 7 operates to stop power supply to the second power supply line 7. However, since the right and left nodes 2a and 2b are also connected through the first power supply line 6, even when the second power supply line 7 is disconnected, power supply from the battery 10 to the nodes 2a and 2b can be continued through the first power supply line 6. Therefore, the auxiliary units 4 connected to the nodes 2a and 2b can normally operate based on the electrical power supplied from the first power supply line 6. Contrary to this, when the first power supply line 6 is short-circuited, electrical power is supplied to the nodes 2a and 2b through the second power supply line 7.

In this embodiment, danger of disabling all the nodes (in other words, all the vehicle auxiliary units) at a time can be avoided by a lightweight, compact, and low-cost structure without using a large-scale system like electrical power controllers.

(Second Embodiment)

Figure 5:
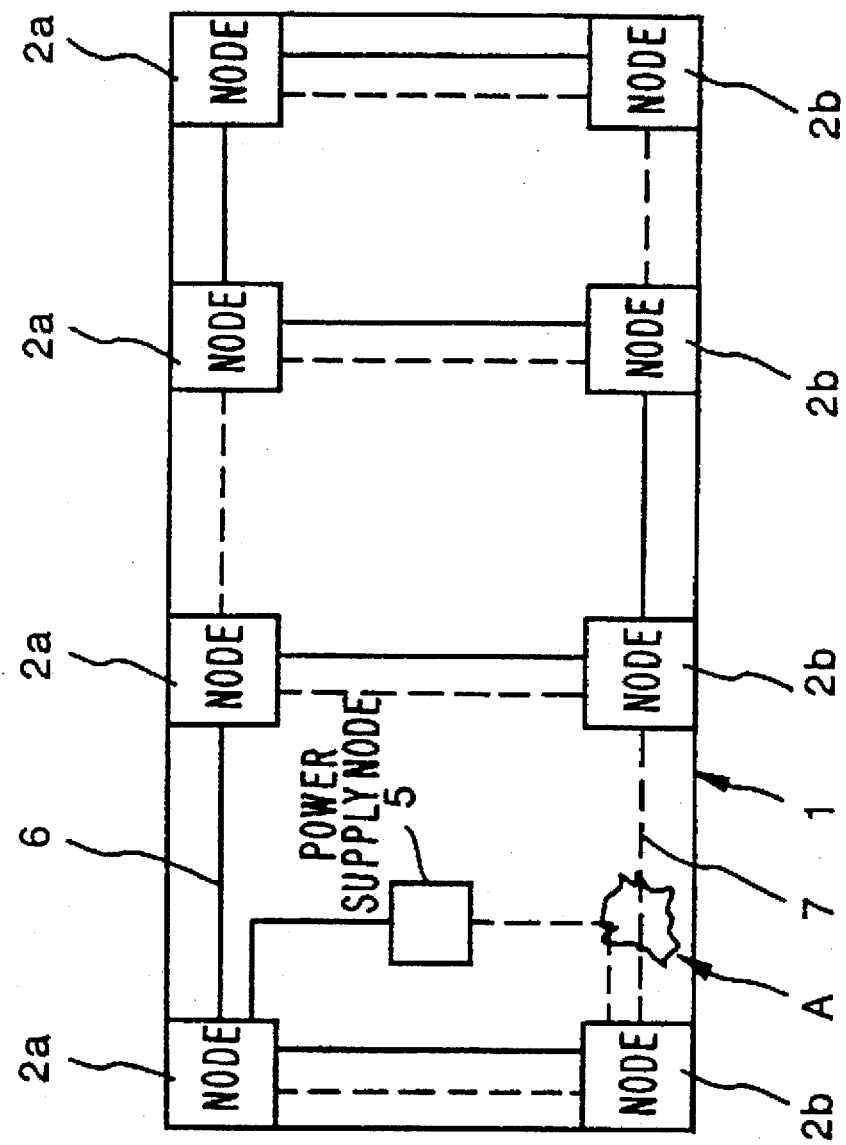
FIG. 5 is a block diagram showing the overall arrangement of a vehicle multiplex transmission apparatus according to the second embodiment of the present invention.

FIG. 5 shows a vehicle multiplex transmission apparatus according to the second embodiment.

In the second embodiment, right and left nodes 2a and 2b are connected through two independent systems of power supply lines 6 and 7 in substantially the same manner as in the first embodiment, except that a pair of nodes (i.e., second and third nodes from the front side) of the right nodes 2a are connected through the second power supply line 7, and a pair of nodes (i.e., second and third nodes from the front side) of the left nodes 2b are connected through the first power supply line 6. Other arrangements, operations, and effects are the same as those in the first embodiment, and a detailed description thereof will be omitted.

(Third Embodiment)

Figure 6:
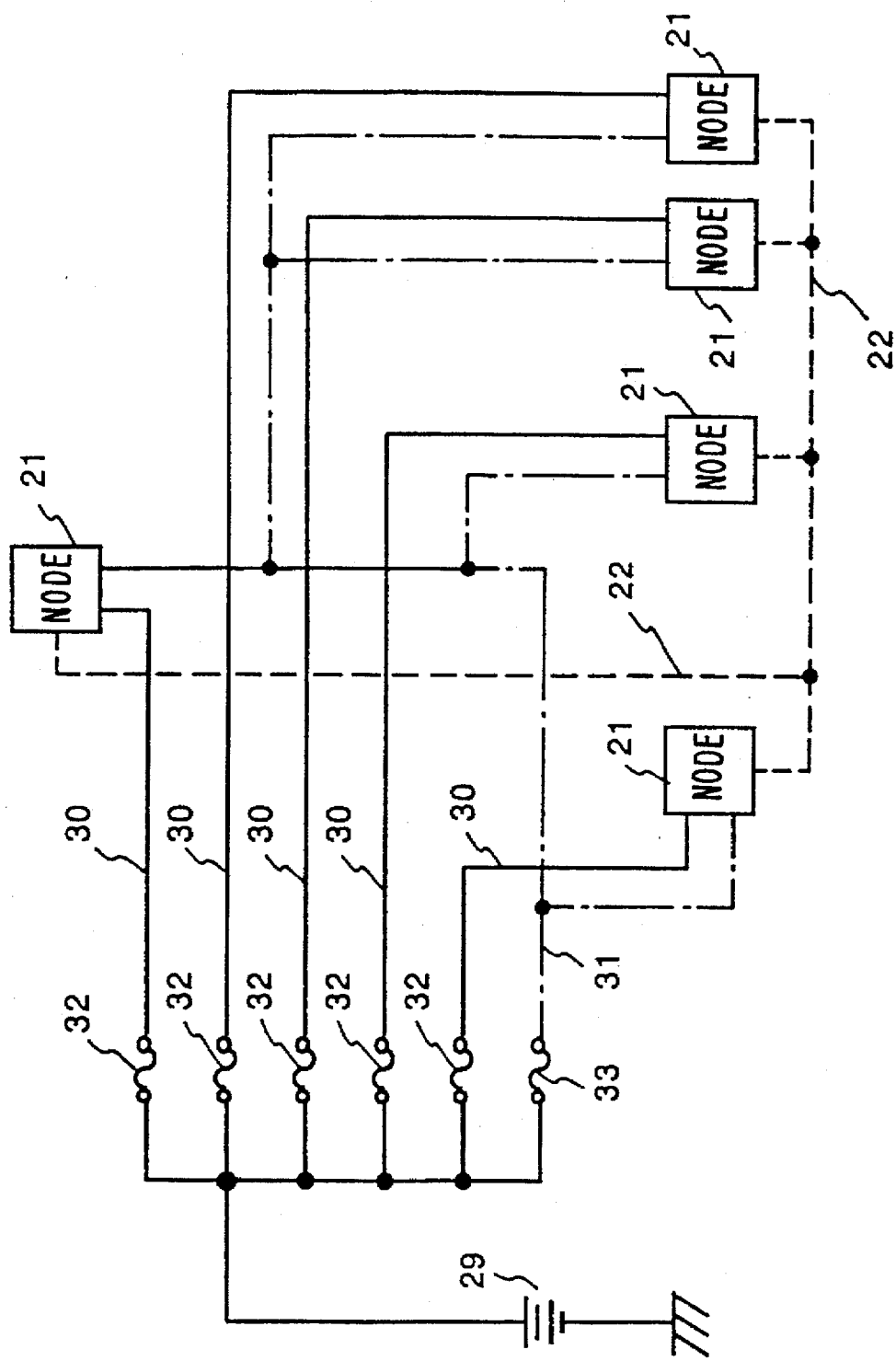
FIG. 6 is a block diagram showing the overall arrangement of a vehicle multiplex transmission apparatus according to the third embodiment of the present invention.

A multiplex transmission apparatus of the third embodiment, as shown in FIG. 6, comprises a plurality of nodes 21 serving as control units for controlling various auxiliary units and various sensors arranged at respective portions of a vehicle, and multiplex transmission signal lines 22 for connecting among these nodes 21.

Figure 7:
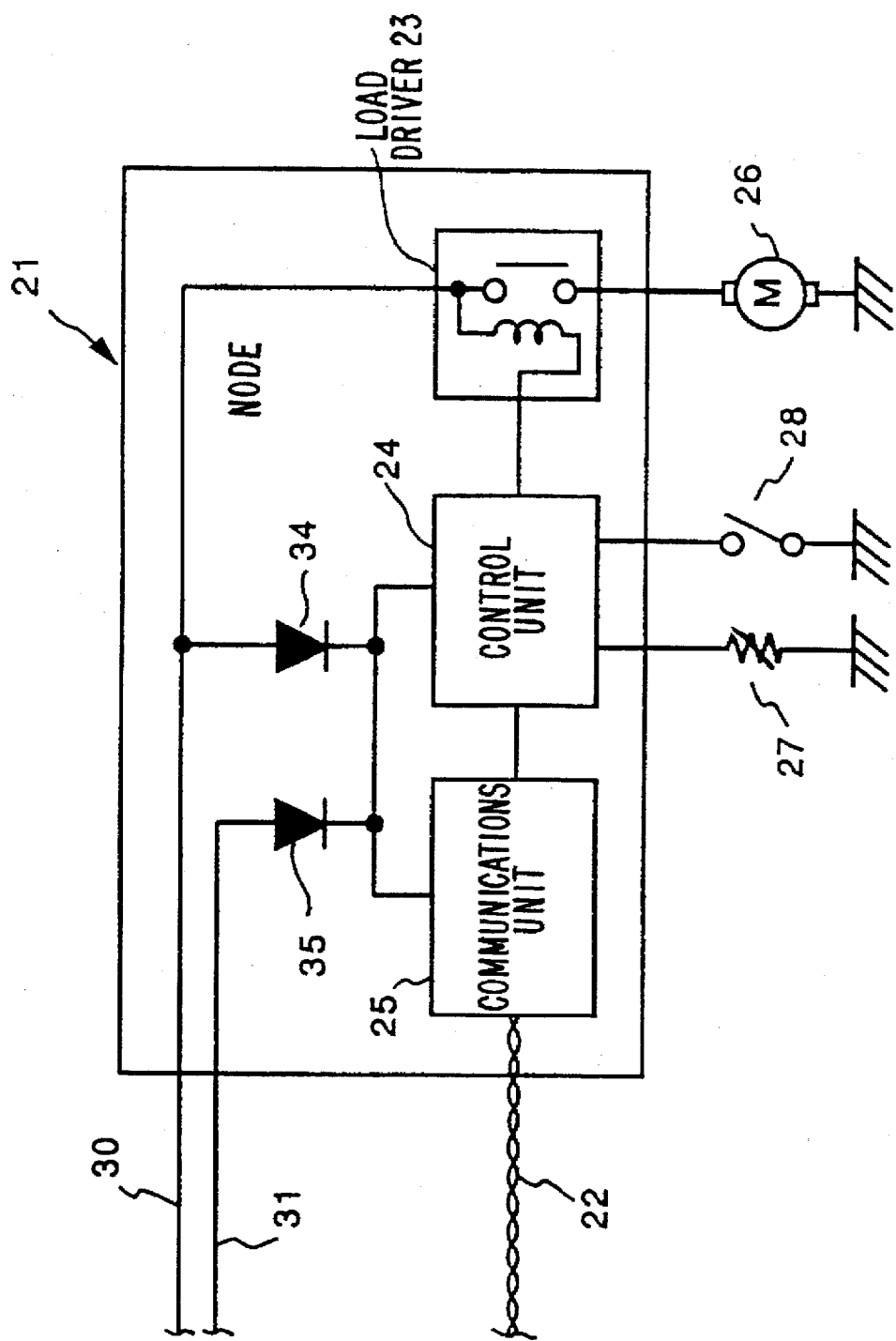
FIG. 7 is a diagram showing the details of a node in the vehicle multiplex transmission apparatus according to the third embodiment of the present invention.

As shown in FIG. 7, each node 21 is constituted by a load driver 23 for performing driving control of a proper load (e.g., a motor serving as an actuator) 26, a control unit 24 for controlling a proper sensor 27, a switch 28, and the load driver 23, and a communication unit 25 for exchanging signals with other nodes 21.

In this embodiment, the load driver 23 comprises a relay, which is energized or deenergized according to a command from the control unit 24.

The load driver 23, the control unit 24, and the communication unit 25 in each node 21 are connected to a main power supply line 30 branching from a power supply 29, and having a fuse 32 serving as a protection means, as shown in FIG. 6. Note that the main power supply line 30 is connected to the control unit 24 and the communication unit 25 through a reverse-flow prevention diode 34.

The control unit 24 and the communication unit 25 in each node 21 are connected to a sub power supply line 31 through a reverse-flow prevention diode 35. The sub power supply line 31 is connected to the power supply 29 through a single fuse 33 serving as a protection means.

The diodes 34 and 35 prevent a power supply current supplied to the control unit 24 and the communication unit 25 from flowing from one power supply line to the other power supply line in the reverse direction even when a difference is formed between power supply voltages on the main and sub power supply lines 30 and 31.

The multiplex transmission apparatus with the above-mentioned arrangement operates as follows.

In a normal state, the load driver 23, the control unit 24, and the communication unit 25 in each node 21 are operated based on electrical power supplied through the main power supply line 30.

When the load 26 connected to the load driver 23 in the specific node 21 is short-circuited by some cause, the fuse 32 of the main power supply line 30 is melted, and power supply to the control unit 24 and the communication unit 25 through this main power supply line 30 is stopped. In this state, the control unit 24 and the communication unit 25 can continuously receive power supply through the sub power supply line 31.

For this reason, the control function of the sensor 27 and the switch 28 and the transmission/reception function with other nodes 21 by the control unit 24 and the communication unit 25 can be assured.

More specifically, according to the multiplex transmission apparatus of the third embodiment, reliability of multiplex transmission can be improved while minimizing increases in the number of power supply lines to be harnessed and in the number of protection means.

(Fourth Embodiment)

Figure 10:
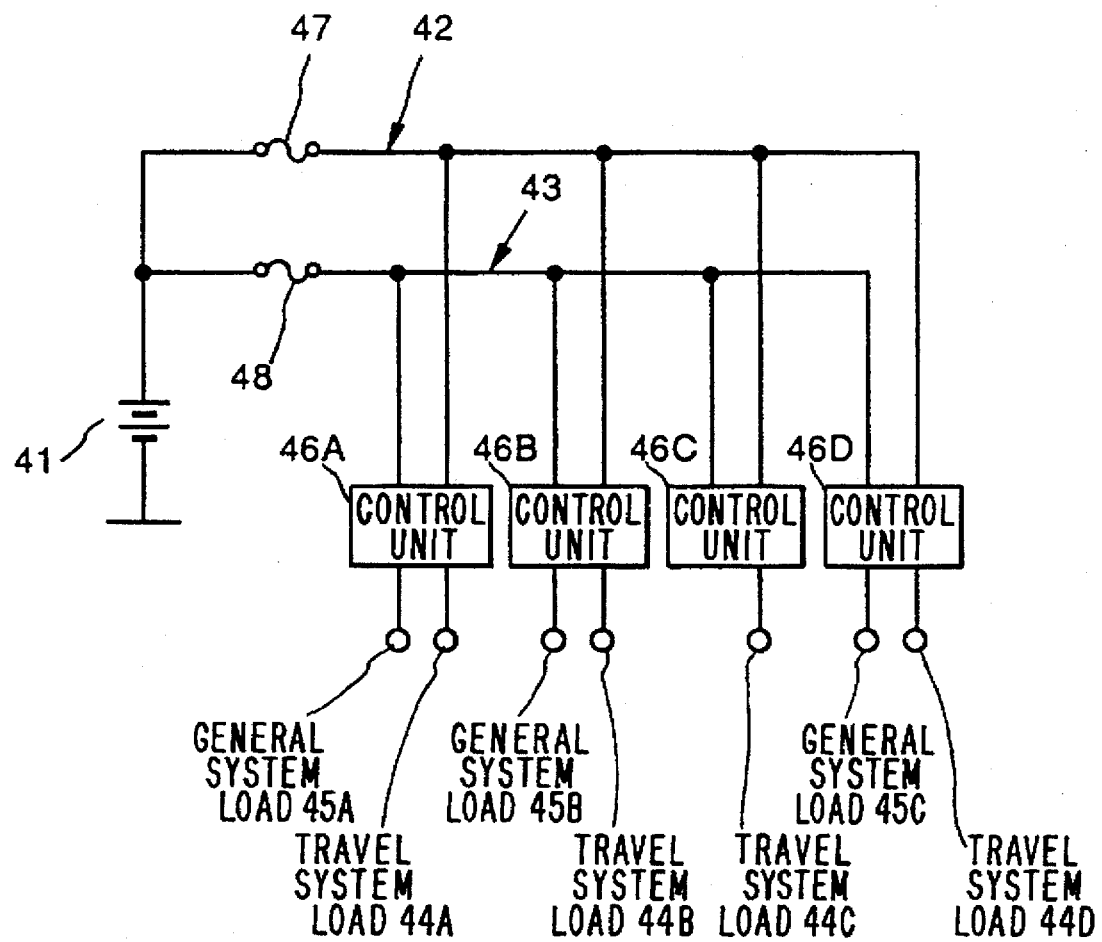
FIG. 10 is a schematic circuit diagram showing the vehicle multiplex transmission apparatus according to the fourth embodiment of the present invention.

FIG. 10 shows a vehicle multiplex transmission apparatus according to the fourth embodiment.

The "−" terminal of a battery 41 mounted in a vehicle is grounded, and its "+" terminal is connected to first and second parallel power supply lines 42 and 43.

The first power supply line 42 is used for supplying a power supply voltage to travel system loads 44A, 44B, 44C, 44D, which are associated with traveling of the vehicle, and the second power supply line 43 is used for supplying a power supply voltage to other general system loads 45A, 45B, 45C, which are not associated with traveling. The first and second power supply lines 42 and 43 are connected to control units 46A, 46B, 46C, 46D for controlling the travel system loads 44A, 44B, 44C, 44D, and the general system loads 45A, 45B, 45C. Reference numeral 47 denotes a travel system fuse provided to the first power supply line 42; and 48, a general system fuse provided to the second power supply line 43.

Note that the travel system loads 44A, 44B, 44C, 44D are actuators for driving auxiliary units associated with traveling, turning, and stopping functions of the vehicle (e.g., actuators for a transmission system, a steering system, and a braking system), and the general system loads are actuators for driving auxiliary units other than the above-mentioned actuators.

Figure 8:
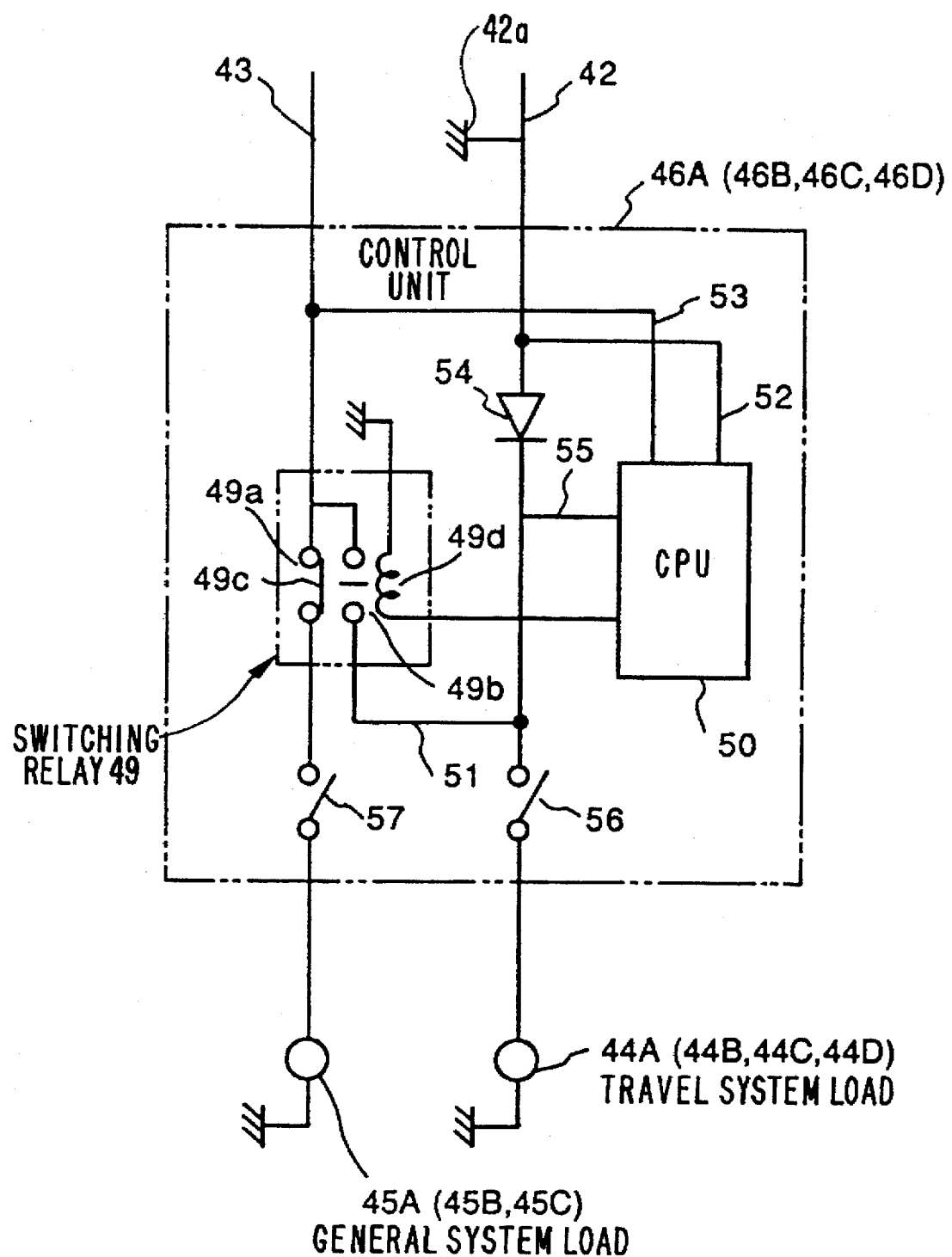
FIG. 8 is a circuit diagram showing a principal part in a vehicle multiplex transmission apparatus according to the fourth embodiment of the present invention.

The control units 46A, 46B, 46C, 46D have the same arrangement. As shown in FIG. 8, each control unit comprises a switching relay 49 as a switching means for switching to be able to supply the power supply voltage from the second power supply line 43 to the travel system load 44A, 44B, 44C, 44D or the like, and a relay control CPU 50 for controlling the operation of the switching relay 49.

The switching relay 49 is constituted by a normally closed contact 49a arranged midway along the second power supply line 43, a normally open contact 49b arranged adjacent to the normally closed contact 49a midway along a branch line 51 branching from the second power supply line 43 and connected to the first power supply line 42, a movable segment 49c for selectively closing the normally closed contact 49a or the normally open contact 49b, and a relay coil 49d, which is energized according to a command from the CPU 50.

The CPU 50 is connected to power drop lines 52 and 53 so as to be able to receive electrical power from the first and second power supply lines 42 and 43. The CPU 50 has a function of comparing voltages on the first and second power supply lines 42 and 43, and a function of outputting a command for energizing the relay coil 49d of the switching relay 49 when the travel system fuse 47 is melted due to short-circuiting on the first power supply line 42, and the voltage on the first power supply line 42 abruptly decreases.

In FIG. 8, reference numeral 54 denotes a reverse-flow prevention diode; 55, a power drop line for, when the travel system fuse 47 on the first power supply line 42 is melted, assuring power supply to the CPU 50; and 56 and 57, operation switches.

Figure 9:
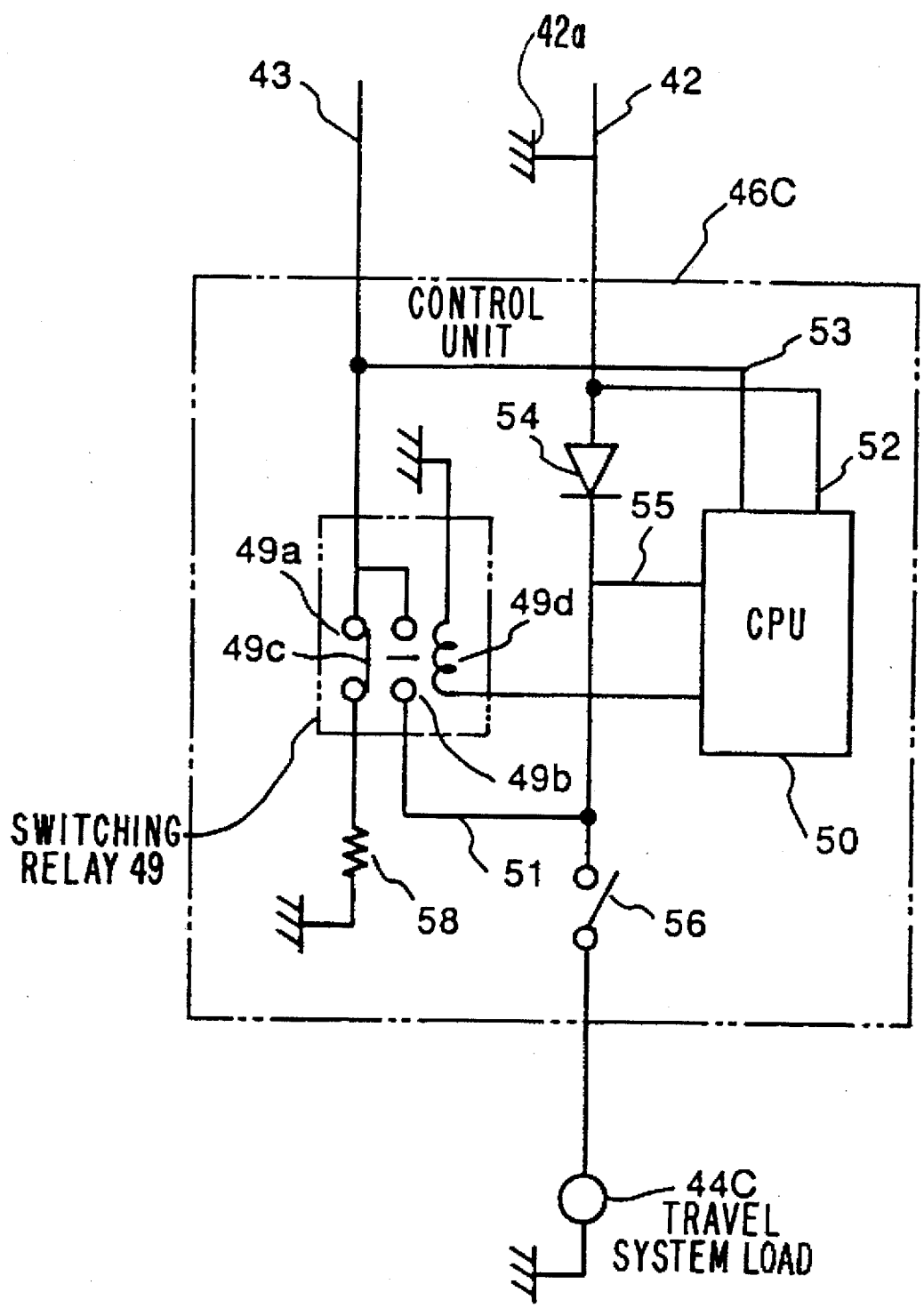
FIG. 9 is a circuit diagram showing another principal part in the vehicle multiplex transmission apparatus according to the fourth embodiment of the present invention.

As shown in FIG. 9, when only a travel system load 44C is connected like in a control unit 46C, the second power supply line 43 is grounded through a proper resistor 58.

The vehicle multiplex transmission apparatus with the above-mentioned arrangement can operate as follows.

In a normal state, electrical power is supplied to the travel system loads 44A, 44B, 44C, 44D through the first power supply line 42, and electrical power is supplied to the general system loads 45A, 45B, 45C through the second power supply line 43. When the first power supply line 42 is short-circuited, as indicated by 42a in FIG. 8 and FIG. 9, and supply of electrical power to the travel system loads 44A, 44B, 44C, 44D through the first power supply line 42 is disabled, the CPUs 50 in the control units 46A, 46B, 46C, 46D detect this state, and energize the corresponding relay coils 49d. As a result, the switching segment 49c of each switching relay 49 closes the normally open contact 49b. Therefore, the travel system loads 44A, 44B, 44C, 44D can receive electrical power through the second power supply line 43, and the functions of the travel system loads 44A, 44B, 44C, 44D can be maintained.

More specifically, the second power supply line 43 can be commonly used as both a power supply line to the general system loads 45A, 45B, 45C, in a normal state, and a power supply line to the travel system loads 44A, 44B, 44C, 44D in an abnormal state. Therefore, the power supply to the travel system loads 44A, 44B, 44C, 44D can be assured without using a sub power supply line (in other words, without increasing the number of power supply lines), thus guaranteeing safety of vehicle travel.

At this time, supply of electrical power to the general system loads 45A, 45B, 45C in the control units 46A, 46B, 46C, 46D is stopped. However, such control is necessary since it is emergency processing for assuring travel safety.

The present invention is not limited to the above embodiments and various changes and modifications can be made within the spirit and scope of the present invention. Therefore, to apprise the public of the scope of the present invention the following claims are made.

What is claimed is:

1. A vehicle multiplex transmission apparatus, comprising:

a power supply node arranged at a predetermined portion of a vehicle;

a plurality of control nodes, including a first group of control nodes and a second group of control nodes arranged in respective portions of the vehicle, controlling vehicle auxiliary units;

a multiplex transmission line connecting said plurality of control nodes;

a first power supply line connecting said power supply node and the first group of control nodes in series to supply electric power to said plurality of control nodes; and a second power supply line connecting said power supply node and the second group of control nodes in series to supply electric power to said plurality of control nodes, wherein the first and second power supply lines are arranged to form different routes respectively so that one of the first power supply line and the second power supply line connects one control node and an adjacent control node directly and the other one of the first power supply line and the second power supply line connects said one control node and said adjacent control node through at least another one control node.

2. The apparatus according to claim 1, wherein each of said plurality of control nodes comprises a load controller, and said load controller is connected to said first and second power supply lines through reverse-flow prevention diodes.

3. The apparatus according to claim 1, wherein said power supply node comprises protection means for protecting said first and second power supply lines, respectively.

4. The apparatus according to claim 3, wherein said protection means comprises a fuse.

5. The apparatus according to claim 1, wherein said vehicle auxiliary units are classified into travel system auxiliary units which are associated with traveling of the vehicle, and general system auxiliary units which are not associated with traveling, said first power supply line is arranged to supply electrical power to said travel system auxiliary units, and said second power supply line is arranged to supply electrical power to said general system auxiliary units, and said apparatus further comprises switching means for switching the electrical power supplied through said second power supply line to said travel system auxiliary units instead of said general system auxiliary units.

6. The apparatus according to claim 1, wherein each of said plurality of control nodes comprises a load driver, a control unit, and a communication unit, said first power supply line is arranged to supply electrical power to said load driver, said control unit, and said communication unit of each of said plurality of control nodes, and said second power supply line is arranged to supply electrical power to only said control unit and said communication unit of each of said plurality of control nodes.

7. The apparatus according to claim 6, further comprising protection means for protecting said second power supply line wherein said second power supply line is connected to said power supply node through single protection means.

8. The apparatus according to claim 7, wherein said protection means comprises a fuse.

9. The apparatus according to claim 6, wherein said first and second power supply lines are connected to said control unit and said communication unit of each of said plurality of control nodes through reverse-flow prevention diodes.

10. A vehicle multiplex transmission apparatus comprising:

a plurality of control nodes, arranged in respective portions of a vehicle, controlling vehicle auxiliary units;

a multiplex transmission line connecting said plurality of control nodes;

a power supply node, arranged at a predetermined portion of the vehicle, supplying electrical power to said plurality of control nodes;

a first power supply line connecting said power supply node with said plurality of control nodes to supply electric power to said plurality of control nodes; and a second power supply line connecting said power supply node with said plurality of control nodes to supply electric power to said plurality of control nodes simultaneously with the supply of electric power to said plurality of control nodes through said first power supply line, said second power supply line being routed on a path to supply power to said plurality of control nodes different from a path the first power supply line is routed to supply power to said plurality of control nodes, wherein each of said plurality of control nodes is connected with both of said first and second power supply lines so that said control nodes are supplied with the electric power from both said first and second power supply lines, and each of said plurality of control nodes comprises a load driver, a control unit, and a communication unit, said first power supply line is arranged to supply electrical power to said load driver, said control unit, and said communication unit of each of said plurality of control nodes, and said second power supply line is arranged to supply electrical power to only said control unit and said communication unit of each of said plurality of control nodes.

11. The apparatus according to claim 10, further comprising protection means for protecting said second power supply line wherein said second power supply line is connected to said power supply node through single protection means.

12. The apparatus according to claim 11, wherein said protection means comprises a fuse.

13. The apparatus according to claim 10, wherein said first and second power supply lines are connected to said control unit and said communication unit of each of said plurality of control nodes through reverse-flow prevention diodes.

14. A vehicle multiplex transmission apparatus, comprising:

a power supply node arranged at a predetermined portion of a vehicle; a plurality of control nodes, arranged in respective portions of the vehicle, controlling vehicle auxiliary units;

a multiplex transmission line connecting said plurality of control nodes;

a first power supply line connecting said power supply node and said plurality of control nodes to supply electric power to said plurality of control nodes; and a second power supply line connecting said power supply node and said plurality of control nodes to supply electric power to said plurality of control nodes, wherein the first power supply line connects a first group of the plurality of control nodes arranged at one side of the vehicle in series and the second power supply line connects a second group of the plurality of control nodes arranged at the other side of the vehicle in series so that the first and second power supply lines form different power supply routes.

15. The apparatus according to claim 14, wherein each of said plurality of control nodes comprises a load controller, and said load controller is connected to said first and second power supply lines through reverse-flow prevention diodes.

16. The apparatus according to claim 14, wherein said power supply node comprises protection means for protecting said first and second power supply lines, respectively.

17. The apparatus according to claim 16, wherein said protection means comprises a fuse.

18. The apparatus according to claim 14, wherein said vehicle auxiliary units are classified into travel system auxiliary units which are associated with traveling of the vehicle, and general system auxiliary units which are not associated with traveling, said first power supply line is arranged to supply electrical power to said travel system auxiliary units, and said second power supply line is arranged to supply electrical power to said general system auxiliary units, and said apparatus further comprises switching means for switching the electrical power supplied through said second power supply line to said travel system auxiliary units instead of said general system auxiliary units.

19. The apparatus according to claim 14, wherein each of said plurality of control nodes comprises a load driver, a control unit, and a communication unit, said first power supply line is arranged to supply electrical power to said load driver, said control unit, and said communication unit of each of said plurality of control nodes, and said second power supply line is arranged to supply electrical power to only said control unit and said communication unit of each of said plurality of control nodes.

20. A vehicle multiplex transmission apparatus, comprising:

a power supply node arranged at a predetermined portion of a vehicle;

a plurality of control nodes, arranged in respective portions of the vehicle, controlling vehicle auxiliary units;

a multiplex transmission line connecting said plurality of control nodes;

a first power supply line connecting said power supply node and said plurality of control nodes to supply electric power to said plurality of control nodes; and a second power supply line connecting said power supply node and said plurality of control nodes to supply electric power to said plurality of control nodes, wherein the first power supply line connects a first group of the plurality of control nodes in series and the second power supply line connects a second group of the plurality of control nodes in series to form different power supply routes so that influences of collision on the vehicle are different at the first and second power supply lines.

21. The apparatus according to claim 20, wherein each of said plurality of control nodes comprises a load controller, and said load controller is connected to said first and second power supply lines through reverse-flow prevention diodes.

22. The apparatus according to claim 20, wherein said power supply node comprises protection means for protecting said first and second power supply lines, respectively.

23. The apparatus according to claim 22, wherein said protection means comprises a fuse.

24. The apparatus according to claim 20, wherein said vehicle auxiliary units are classified into travel system auxiliary units which are associated with traveling of the vehicle, and general system auxiliary units which are not associated with traveling, said first power supply line is arranged to supply electrical power to said travel system auxiliary units, and said second power supply line is arranged to supply electrical power to said general system auxiliary units, and said apparatus further comprises switching means for switching the electrical power supplied through said second power supply line to said travel system auxiliary units instead of said general system auxiliary units.

25. The apparatus according to claim 20, wherein each of said plurality of control nodes comprises a load driver, a control unit, and a communication unit, said first power supply line is arranged to supply electrical power to said load driver, said control unit, and said communication unit of each of said plurality of control nodes, and said second power supply line is arranged to supply electrical power to only said control unit and said communication unit of each of said plurality of control nodes.

* * * * *

UNITED STATES PATENT AND TRADEMARK OFFICE
CERTIFICATE OF CORRECTION

PATENT NO.   : 5,675,189

DATED        : October 7, 1997

INVENTOR(S)  : Mitsuru Anma, et al.

It is certified that error appears in the above-identified patent and that said Letters Patent is hereby corrected as shown below:

On the title page, item [75] Inventors: --Hiroshi Suzuki-- should be added.

Signed and Sealed this

Tenth Day of March, 1998

*Attest:*

BRUCE LEHMAN

*Attesting Officer*     *Commissioner of Patents and Trademarks*